Patented Nov. 11, 1952

2,617,817

UNITED STATES PATENT OFFICE 2,617,817

PERFLUOROALKYL ISOCYANATES

Arthur H. Ahlbrecht, White Bear Township, Ramsey County, and Donald R. Husted, St. Paul, Minn., assignors to Minnesota Mining & Manufacturing Company, St. Paul, Minn., a corporation of Delaware No Drawing. Application May 5, 1951,
Serial No. 224,834

2 Claims. (Cl. 260—453)

This invention relates to our discovery of a new and useful class of reactive fluorocarbon compounds, namely, the fully fluorinated alkyl isocyanates (perfluoroalkyl isocyanates) having from 3 to 12 carbon atoms in the molecule.

These new compounds have a saturated aliphatic fluorocarbon chain (containing 2 to 11 carbon atoms) directly bonded to a single reactive isocyanate group (—NCO) and are represented by the following formula:

$$C_nF_{2n+1}NCO$$

where $n$ has an integer value of 2 to 11.

The saturated fluorocarbon chain imparts novel characteristics due to its unique combination of physical and chemical properties. It is non-polar and has a high degree of chemical inertness and thermal stability. It is both hydrophobic and oleophobic, lacking an affinity for either water or hydrocarbons. The terminal fluorocarbon group of the chain is remote from the reactive cyanate group at the other end of the molecule. The fluorocarbon isocyanate molecules which have at least four carbon atoms in the molecule have marked surface active properties owing to the combination of a substantial fluorocarbon chain with a reactive isocyanate group. The properties of the present compounds differ materially from trifluoromethyl isocyanate, $CF_3NCO$, a gaseous compound wherein the isocyanate group is united to a trifluoromethyl group consisting of a single fluorinated carbon atom.

Our new compounds range in boiling point from about −9° to about 200° C. (at 740 mm.). The compounds having four or more carbon atoms in the molecule are colorless liquids, the first member of this sub-group being a very volatile liquid having a boiling point of about 25° C.

The following table lists the approximate boiling points (at 740 mm.) of these compounds:

| Compound: | B. P. (°C.) |
|---|---|
| $CF_3CF_2NCO$ | −9 |
| $CF_3(CF_2)_2NCO$ | 25 |
| $CF_3(CF_2)_3NCO$ | 53 |
| $CF_3(CF_2)_4NCO$ | 77 |
| $CF_3(CF_2)_5NCO$ | 99 |
| $CF_3(CF_2)_6NCO$ | 119 |
| $CF_3(CF_2)_7NCO$ | 140 |
| $CF_3(CF_2)_8NCO$ | 160 |
| $CF_3(CF_2)_9NCO$ | 180 |
| $CF_3(CF_2)_{10}NCO$ | 200 |

The reactions of these compounds cannot be predicted from those of the analogues in the hydrocarbon system of alkyl isocyanates of conventional organic chemistry. In general, the reactions are different and surprising.

For instance, the reaction of our compounds with water yields an amide having one less carbon atom and two less fluorine atoms. Thus $C_3F_7NCO$ reacts with water to form $C_2F_5CONH_2$. In contrast, the normal reaction of an alkyl isocyanate with water gives a disubstituted urea.

As another illustration, the normal reaction of an alkyl isocyanate with ammonium hydroxide gives a substituted urea. However, when $n$-perfluoropropyl isocyanate, $CF_3(CF_2)_2NCO$, is added to ammonium hydroxide, a compound is formed which upon isolation is found to have a melting point of 156–158°, with an analysis corresponding to an empirical formula of $$C_4H_4ON_3F_5$$

and whose structure we believe is:

$$CF_3-CF_2-\underset{\underset{NH_2}{|}}{C}=N-\underset{\underset{O}{\|}}{C}-NH_2$$

or a polymer thereof. This compound is basic and precipitates a hydrochloride salt when it is dissolved in ether and anhydrous HCl is passed in.

On the other hand, some of the reactions are normal, and provide useful routes to certain desirable types of fluorinated derivative compounds. Thus the present fluorocarbon isocyanates react exothermally with alcohols and phenols to give fluoro-urethane addition products. For example, $CF_3(CF_2)_2NCO$ reacts with $CH_3OH$ to give:

$$CF_3-CF_2-CF_2-\underset{\underset{H}{|}}{N}-\underset{\underset{O}{\|}}{C}-O-CH_3$$

which is a high-boiling liquid, insoluble in water. This urethane reacts with ammonium hydroxide to give a solid melting at 104–106° C., thought to be:

$$CF_3-CF_2-\underset{\underset{NH_2}{|}}{C}=N-\underset{\underset{O}{\|}}{C}-O-CH_3$$

or a polymer thereof.

The reaction of $CF_3(CF_2)_2NCO$ with o-bromo phenol gives a white crystalline solid melting at 93° C. Analysis indicates the structure is the urethane:

$$CF_3-CF_2-CF_2-\underset{\underset{H}{|}}{N}-\underset{\underset{O}{\|}}{C}-O-C_6H_4Br$$

Reaction of $CF_3(CF_2)_2NCO$ with p-chlorophenol gives a white crystalline solid melting at 121° C., having the urethane structure:

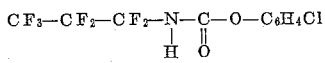

From the reaction of $C_3F_7NCO$ with acetic acid only the above-mentioned water reaction product, the amide, $C_2F_5CONH_2$, has been isolated. From the reaction with alcoholic NaOH only the sodium salt, $C_2F_5COONa$, has been isolated.

Preparation

The fluorocarbon isocyanates cannot be isolated out of any reaction where water is produced since they react with water, as previously mentioned, to form an amide having one less carbon atom.

We have found that our compounds can be produced in good yields by a non-aqueous procedure involving the reaction with sodium azide of a perfluoroalkyl acid chloride in an anhydrous hydrocarbon solvent, such as toluene or xylene, followed by thermal decomposition of the resultant perfluoroacyl azide in the solvent vehicle. Owing to the possibility of an explosion, we recommend that no attempt be made to distill or isolate the perfluoroacyl azide, but that it be decomposed in situ in the solvent vehicle. The use of explosion shields is recommended in all cases in following our procedure, as a safety precaution, even though we have experienced no trouble as yet except in making the perfluoroethyl isocyanate.

The two stages of the reaction procedure can be represented as follows:

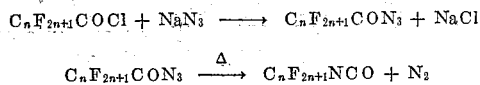

Example 1

The apparatus was a dry 3-necked 500 ml. flask fitted with a gas inlet tube extending below the liquid level, a gas-tight stirrer, and a reflux condenser fitted with a gas connection leading to a trap cooled with a mixture of acetone and Dry Ice (solid $CO_2$) and from there to a gas collecting system.

The flask was charged with 125 grams of anhydrous toluene (previously dried over sodium) and 25 grams (0.385 mol) of sodium azide, the latter forming a suspension. The mixture was cooled by an ice bath and, with constant stirring, 57 grams (0.313 mol) of perfluoropropionyl chloride, $CF_3CF_2COCl$, was slowly introduced. The stirring was continued for an hour and the ice bath was then removed. (Note—If the reaction mixture shows any indication of warming to above room temperature, the ice bath should be replaced and cooling continued for another hour.) The mixture was allowed to stand overnight at room temperature, stirring being continued.

The perfluoropropionyl azide reaction product was decomposed by gently heating the flask to reflux and regulating the temperature so as to cause a moderate and even evolution of nitrogen. The crude isocyanate product was collected in the cold trap and the progress of the reaction was followed by collecting the nitrogen after passage therethrough.

(Warning.—The apparatus must be adequately protected by explosion shields. In an experiment performed as above described, the reaction mixture exploded after about one-fourth of the calculated total of nitrogen had been evolved, even though the evolution appeared smooth and liquid was refluxing in the condenser. This shows that the perfluoropropionyl azide (which contains 22.5% nitrogen) is sufficiently explosive so that it should be handled with great care. This experience indicates that the next lower azide, perfluoroethanoyl azide, would be dangerously explosive and it is questionable whether it can be effectively employed to make trifluoromethyl isocyanate, $CF_3NCO$.)

The contents of the cold trap was purified by distillation in a low temperature still to yield relatively pure perfluoroethyl isocyanate, $CF_3CF_2NCO$, having a boiling point of minus 9° C. (at 742 mm. pressure). The identification was confirmed by the infra-red absorption spectral curve.

Example 2

The apparatus was a dry 3-necked 500 ml. flask equipped with a stirrer, a dropping funnel, and a total-reflux still head whose outlet was connected to a trap cooled with a mixture of acetone and Dry Ice (solid $CO_2$), which in turn was connected to a gas collector.

The flask was charged with 135 grams of anhydrous toluene (previously dried over sodium) and 14 grams (0.216 mol) of sodium azide ($NaN_3$). With continued stirring, 46.4 grams (0.2 mol) of n-perfluorobutyryl chloride (B. P. 38° C.), $CF_3(CF_2)_2COCl$, was slowly added. An ice water bath was used to cool the flask during the addition. The resultant mixture was then stirred for 24 hours.

The perfluorobutyryl azide reaction product was decomposed by heating the flask sufficiently to cause evolution of nitrogen, and the progress of the reaction was followed by collecting the nitrogen after passage through the cold trap. The volatile isocyanate product collected in the trap.

The contents of the trap was distilled through a 14-inch fractionation column packed with glass helices, giving 32 grams of product boiling at 24–26° C. (at 739 mm. pressure). Yield was 76%. This product was identified as relatively pure n-perfluoropropyl isocyanate,

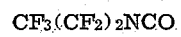

The molecular weight was 215, determined from vapor density, as compared to the calculated formula weight of 211. Analysis showed 6.6% N (calc. 6.65%) and 61.5% F (calc. 63%).

Example 3

The apparatus was a dry 3-necked 250 ml. flask fitted with a dropping funnel, a gas-tight stirrer, and a reflux condenser fitted with a gas outlet connection leading to a trap cooled with a Dry Ice/acetone mixture and from there to a gas collecting system.

The flask was charged with 75 ml. of anhydrous toluene and 6.5 grams (0.1 mol) of sodium azide. With continued stirring, dropwise addition was made of 25 grams (0.089 mol) of perfluorovaleryl chloride, $CF_3(CF_2)_3COCl$. After stirring overnight, the mixture was heated to reflux and the heating and stirring were continued until the evolution of gas ceased. The reflux condenser was then replaced by a distillation head and the crude isocyanate (B. P. 40–65° C.) was recovered by distillation.

Redistillation yielded 13.5 grams of a purified product having a boiling point of 52–53° C. (at 753 mm.), identified as n-perfluorobutyl isocyanate, $CF_3(CF_2)_3NCO$. This compound was a colorless liquid having a refractive index of 1.279 (at 25° C.) and a density of 1.568 (grams/cc. at 20° C.). Analysis showed 5.3% N (calc. 5.36%) and 64.3% F (calc. 65.5%).

*Example 4*

The apparatus was a dry 3-necked 125 ml. flask equipped with a stirrer, a dropping funnel, and a reflux condenser whose outlet was protected by a drying tube containing anhydrous calcium sulfate.

The flask was charged with 75 ml. of anhydrous xylene and 2.16 grams (0.033 mol) of sodium azide. With continued stirring, 11 grams (0.033 mol) of n-perfluorocaproyl chloride (B. P. 89° C.), $CF_3(CF_2)_4COCl$, was slowly added. After stirring for 24 hours, heat was gently applied to decompose the perfluorocaproyl azide, the evolution of nitrogen providing a means of following the reaction. The reflux condenser was replaced by a still head. The isocyanate product distilled out at a temperature of 70–80° C.

Redistillation through a heated column packed with glass helices yielded a purified product having a boiling point of 75–78° C. (at 735 mm.), identified as relatively pure n-perfluoroamyl isocyanate, $CF_3(CF_2)_4NCO$. The yield was 50%. This compound was a colorless liquid having a refractive index (at 25° C.) of 1.290 and a density of 1.696 (grams/cc. at 20° C.).

*Example 5*

Using a procedure similar to that of the preceding example, n-perfluorocapryl chloride (B. P. 170° C.), $CF_3(CF_2)_8COCl$, was converted to the azide and the latter was decomposed to yield, upon redistillation, a product identified as relatively pure n-perfluorononyl isocyanate, $CF_3(CF_2)_8NCO$, having a boiling point of 160–161° C. (743 mm.). This compound was a colorless liquid having a refractive index (at 20° C.) of 1.302 and a density of 1.789 (grams/cc. at 20° C.). Analysis showed 70.3% F (calc. 70.7%), 2.6% N (calc. 2.7%).

*Preparation of starting compounds*

The perfluoroalkyl acid chlorides, $C_nF_{2n+1}COCl$, can be synthesized in high yields by refluxing with phosphorous pentachloride or with benzoyl chloride the corresponding perfluoroalkyl acids $$C_nF_{2n+1}COOH$$

and separating the desired product by fractional distillation.

These perfluoroalkyl acids can be made by hydrolyzing the corresponding perfluoroalkyl acid fluorides, $C_nF_{2n+1}COF$. The latter can be made by the Simons electrochemical process, see U. S. Patent No. 2,519,983 (Aug. 22, 1950); electrolyzing the corresponding alkyl carboxylic acid $$(C_nH_{2n+1}COOH)$$

or its anhydride, in anhydrous liquid hydrogen fluoride in a nickel-anode steel-cathode type of cell at an applied cell voltage of about 5 to 6 volts.

Certain fluorocarbon acids and their halides are described and claimed in the copending application of A. R. Diesslin, E. A. Kauck and J. H. Simons, S. N. 70,154, filed January 10, 1949, since issued as Patent No. 2,567,011 (September 4, 1951). See, also, the paper of Kauck and Diesslin published in the October 1951 issue of Industrial and Engineering Chemistry (vol. 43, pp. 2332–34).

We claim:

1. As new and useful reactive fluorocarbon compounds, the perfluoroalkyl isocyanates which have 3 to 12 carbon atoms in the molecule.

2. As new and useful reactive fluorocarbon compounds, the perfluoroalkyl isocyanates which have from 4 to 12 carbon atoms in the molecule.

ARTHUR H. AHLBRECHT.
DONALD R. HUSTED.

REFERENCES CITED

The following references are of record in the file of this patent:

Huckel, Nachr Akad. Wiss. Gottingin Math.-physik Klasse (1946) pp. 36–37, as abstracted in Chem. Abstracts, vol. 43, col. 6793 (1949).